June 28, 1938.　　J. A. J. BENNETT　　2,122,274
TORSIONAL VIBRATION ABSORBER
Original Filed Sept. 28, 1935　　2 Sheets-Sheet 2
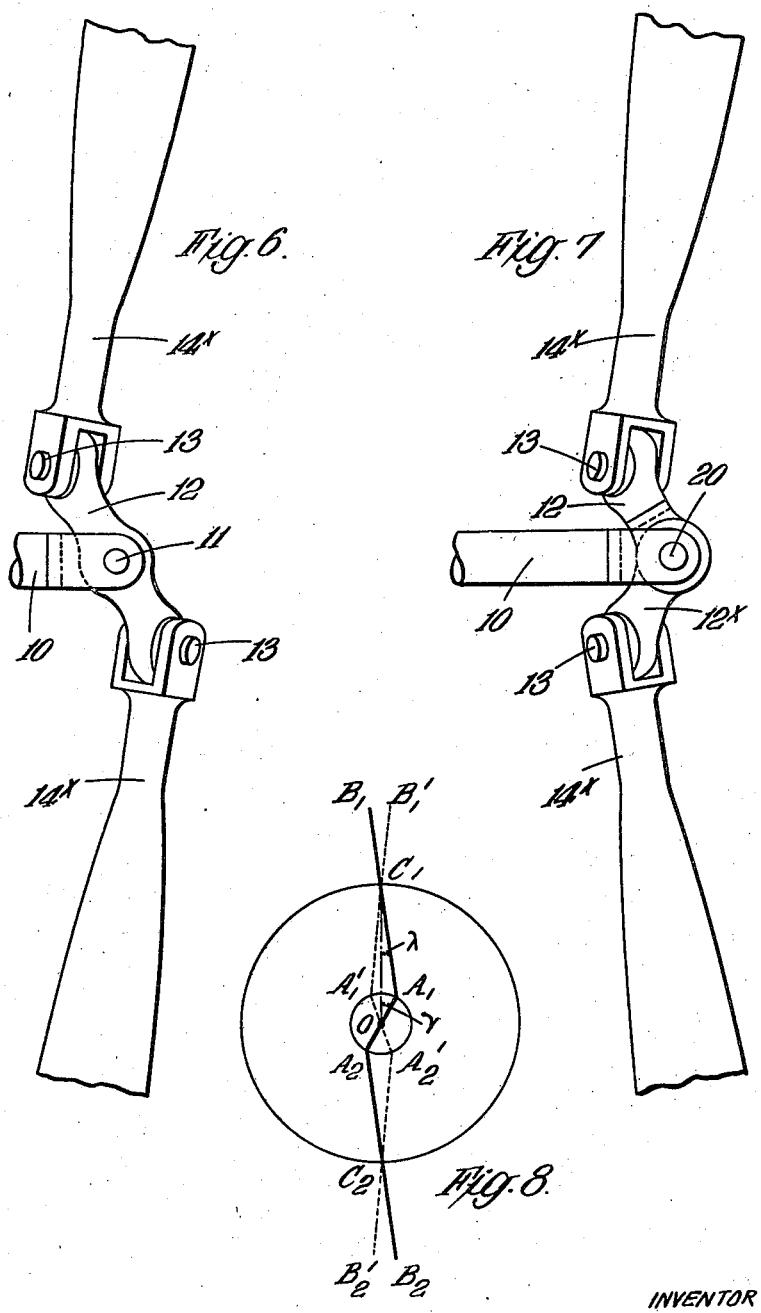
INVENTOR
James Allan Jamieson Bennett
ATTORNEYS
Synnestvedt & Lechner Patented June 28, 1938

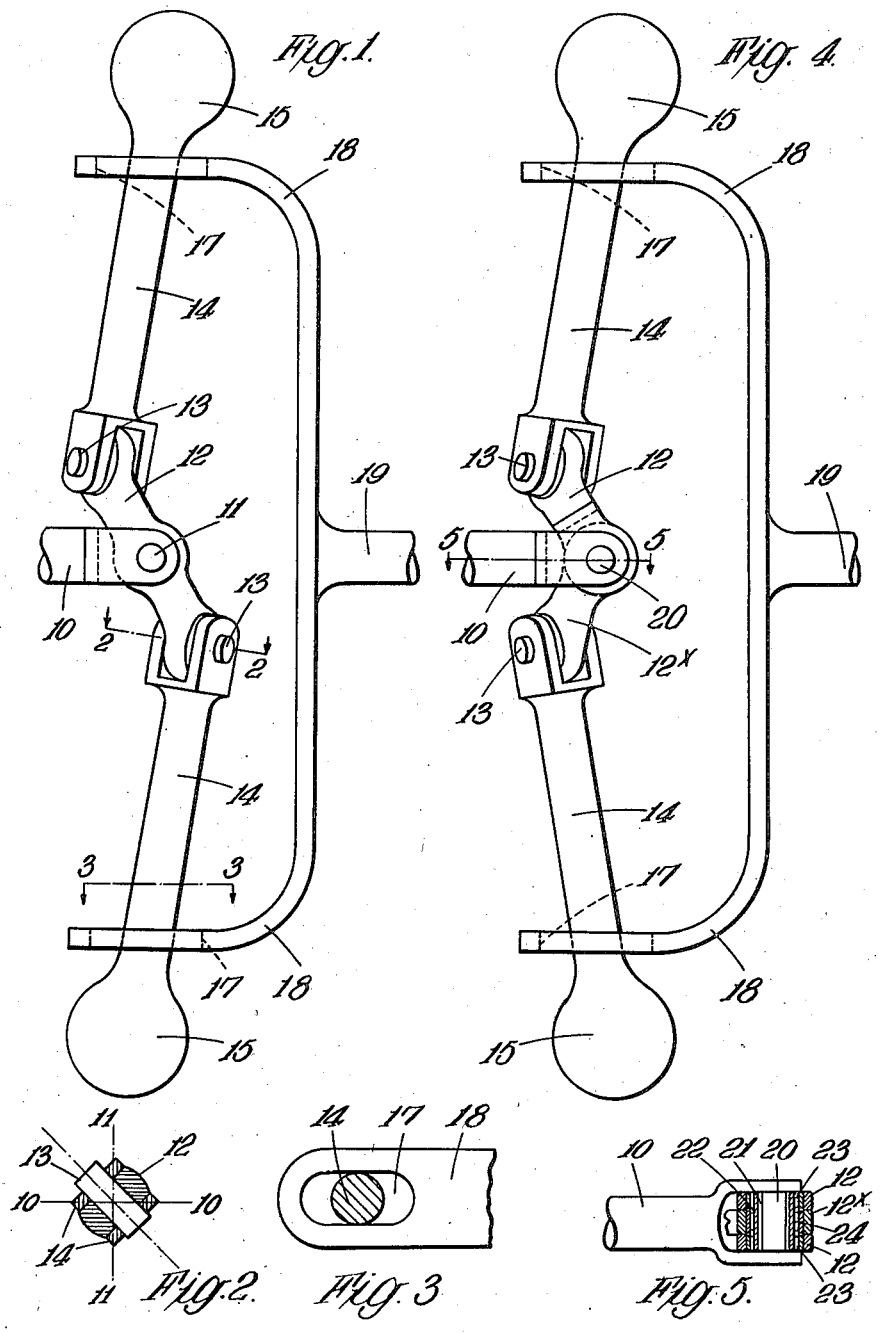

2,122,274

UNITED STATES PATENT OFFICE 2,122,274

TORSIONAL VIBRATION ABSORBER

James Allan Jamieson Bennett, Genista, Newton Mearns, Scotland, assignor to G. & J. Weir Limited, Glasgow, Scotland, a joint-stock company of England Application September 28, 1935, Serial No. 42,605. Renewed December 23, 1937. In Great Britain October 4, 1934

20 Claims. (Cl. 170—164)

This invention relates to a method and means for minimizing the amplitude of torsional vibration for use in a rotary system in which fluctuating torque is transmitted between coaxial rotating masses, whereby to answer requirements commonly experienced in technical practice, as, for instance, in the case of a propeller driven by a reciprocating engine, or of a reciprocating pump driven by an electric motor, that is, in general, in the case of a system comprising a driving rotor element and a driven rotor element, one of which elements is subject to fluctuating torque.

In a system subject to forced vibrations the parameter on which the amplitude of the forced vibrations depends is the ratio $$\frac{m}{p}$$

$m$ being the frequency of the forced vibrations and $p$ the natural frequency of the system. When this ratio is small compared with unity, the amplitude of the forced vibrations is practically equal to the statical deflection obtained by neglecting the acceleration or inertia of the system. As $$\frac{m}{p}$$

increases toward unity, the amplitude increases. Resonance occurs when $$\frac{m}{p} = 1$$

When $$\frac{m}{p}$$

is very great, the amplitude of the forced vibrations is very small.

If the forced vibration is not simple harmonic, resonance with a harmonic of the fundamental forced frequency $m$ may be established when $$\frac{p}{m}$$

is a whole number.

In order to reduce the frequency of the natural vibrations and thus to increase the ratio $$\frac{m}{p}$$

to a value great enough to considerably decrease the amplitude of the forced vibrations, there are sometimes employed for transmission of rotation flexible couplings incorporating springs or other resilient mechanical means.

Any arrangement incorporating springs is bound to have one or more critical speeds of rotation on account of the fact that the natural frequency of the system is governed by the characteristics of the spring or springs which are independent of the rotational speed.

An object of the present invention is to provide a method of decreasing the natural frequency of a rotary system of the kind referred to, which will avoid the introduction of critical speeds by utilizing the inertia of a mass or masses mounted within the system with a certain degree of freedom, the centrifugal force developed by such mass taking the place of the resilience of a spring connection.

According to the present invention the method of decreasing the amplitude of torsional oscillation of a rotary system subjected to fluctuating torque consists in utilizing the angular displacement of a mass in a plane containing the axis of rotation to receive and restore the fluctuating energy of the system, by so partially constraining said mass, which is offset from the axis of rotation, that angular displacement thereof in the plane of rotation, relatively to the shaft supporting it, is accompanied by angular displacement in the first named plane.

More particularly the method consists in utilizing the inertia of a mass, mounted to operate as a centrifugal pendulum, whose plane of oscillation is inclined at an acute angle to the plane of rotation, to receive and restore the fluctuating energy of the system.

In a rotary power system the means for decreasing the amplitude of torsional oscillation in accordance with the method described above comprises a shaft, one or more masses offset therefrom and pivot means connecting said masses to said shaft in such a manner that displacement of the masses relatively to the shaft in the plane of rotation is associated with a relative displacement in the plane containing the rotational axis.

Preferably the means connecting each mass to the shaft includes a link connected to the shaft by a pivot, whose axis intersects the shaft axis at right angles and connected to the mass by a pivot whose axis is offset from the first named pivot axis, the projections of said pivot axes on a plane at right angles to the common perpendicular on said pivot axes being at an acute angle to one another and the offset of the mass from the shaft axis being large compared with the offset between the pivot axes, i. e. the length of the link.

For purposes of balance it is preferable to provide at least two oppositely disposed masses which may be articulated to the ends of a common link pivoted to the shaft at its centre or the oppositely disposed masses may be articulated to separate links which are articulated to the shaft on a common pivot.

The pivoted rotating mass (or masses) may have sufficient rotational inertia to ensure that the angular oscillations thereof in the plane of rotation shall be small compared with the torsional angular oscillations of the rotor or shaft on which the hinged mass (or masses) is pivotally mounted; or the said mass (or masses) may not in itself have sufficient rotational inertia to ensure that its angular oscillations in the plane of rotation shall be small compared with the torsional angular oscillations of the rotor or shaft, in which latter case the said mass (or masses) may be torsionally constrained with respect to a rotary element of sufficient rotational inertia to ensure that the hinged mass (or masses) shall have relatively invariable angular speed, said rotary element not being otherwise connected to the rotor or shaft carrying the said mass (or masses).

The said pivoted rotating mass (or masses) should have such moment of inertia, and the link if present, should be of such a length that the natural frequency of the system is relatively low. It is a characteristic of the method and means of the present invention that when, at the normal or maximum speed of rotation of the system, the frequency of the natural vibrations does not correspond with the fundamental frequency or with any important harmonic of the forced vibration, the system has no critical speed or speeds.

The reason for the total absence of resonance over the whole range of rotational speeds is that the flexibility is obtained, not by resilient mechanical means with a fixed natural frequency, as in certain known forms of flexible coupling, but by an oscillating system in which the restoring forces vary with the rotational speed. Hence, the ratio $$\frac{m}{p}$$

is independent of the speed of rotation.

The provision of a link or links connecting the hinged mass or masses to the shaft, said link being rockable in the plane containing the rotational axis and the mass or masses, is of great advantage in that the result of interposing such a link is that the oscillation of the hinged mass takes place substantially about its centre of inertia with respect to the pivot connecting the mass to the link, i. e. about the point at which the resultant centrifugal force is applied. This has the effect of eliminating bending moments in the shaft as compared with a system in which the oscillating mass is directly hinged to the shaft.

In applying the present invention to a shaft coupling, the offset mass or masses articulated to the shaft is (or are) connected to a second coaxial shaft, the arm (or arms) carrying or constituting the mass (or masses) being engaged at a point offset from the axis by a spider or the like mounted on the second shaft, the connection between the arm and the spider being such that relative movement can take place only in a direction parallel to the axis.

On the other hand in applying the invention to a screw propeller the offset masses are constituted by the propeller blades themselves. In this case the member of the system subjected to substantially constant (resistance) torque is the assembly of blades and the member subjected to fluctuating torque is the driving shaft of the propeller.

The accompanying drawings illustrate the application of the invention to a shaft coupling (Figs. 1 to 5) and to a screw propeller (Figs. 6 and 7).

In the drawings:—

Fig. 1 shows in side elevation a shaft coupling according to the invention.

Figs. 2 and 3 illustrate in section details of Fig. 1, the sections being respectively taken along the lines 2—2 and 3—3 of Fig. 1.

Fig. 4 shows in side elevation a modification of the shaft coupling of Fig. 1.

Fig. 5 is a detail view, partly in section, taken along the line 5—5 of Fig. 4.

Fig. 6 shows in side elevation a screw propeller constructed in accordance with the invention.

Fig. 7 is a view similar to Fig. 6 of a modification of the screw propeller of Fig. 6.

Fig. 8 is a diagram viewed in the direction of the axis of rotation showing the mode of vibration of the systems illustrated in Figs. 1 to 7.

Figs. 1 to 3 show a device for coupling two coaxial shafts 10 and 19 respectively of which the former 10 is subjected to a fluctuating torque and the latter 19 is subjected to a relatively constant torque. It is immaterial which of the two shafts is the driver and which the driven. For instance, in the case of a reciprocating engine driving an electric motor the shaft of the engine is that subjected to the fluctuating torque and will be represented by the shaft 10 in Fig. 1, whereas the shaft of the motor is subjected to a relatively constant resistance torque and will be represented by the shaft 19 in Fig. 1. On the other hand, in the case of an electric motor driving a reciprocating pump, the position will be reversed, the shaft 19 being the motor shaft and the shaft 10 the pump shaft.

At the end of shaft 10 is arranged a pivot 11 whose axis intersects the axis of shaft 10 at right-angles. On this pivot is carried a short link or balance member 12 to whose ends are pivoted at 13 a pair of arms 14 carrying masses 15 at their ends. The arms 14 are passed through slots 17 in the ends of a pair of arms 18 constituting a spider mounted on the other shaft 19, the slots 17 being parallel to the axis of the shafts. The arms 14 are thus free to execute limited movement in the axial direction with respect to the shaft 19 but at the points where they pass through the slots 17 are not free to move relatively to the shaft 19 in the plane of rotation. The axes of the pivot 13 on which the arms 14 are mounted are so oriented that an angular displacement of arm 14 on its pivot 13 is compounded of an angular displacement in the plane of rotation and an angular movement in the plane containing the centre line of the link 12 and the axis of rotation, i. e. the plane perpendicular to the axis of the pivot 11. The inclination of the pivot 13 is illustrated in Fig. 2, in which the chain dotted lines 10—10 and 11—11 represent the projections on the plane of the section of the axis of the shaft 10, i. e. the rotational axis, and the axis of the pivot 11, when the link 12 and arm 14 are perpendicular to the shaft 10, i. e. when the arms 14 and the link 12 are in line with one another and perpendicular to the shaft and not in the angularly displaced position in which they are shown in Fig. 1.

The modification shown in Figs. 4 and 5 differs from the arrangement of Figs. 1 to 3 in that for a single link 12 is substituted a pair of links 12, 12x mounted on a common pivot 20 which replaces the pivot 11 of Fig. 1.

In this arrangement the inclinations of the pivot axes 13 with reference to the direction of rotation are opposite, i. e. their projections on the plane through the axis of shaft 10 perpendicular to the plane of the figure are coincident, when the links 12, 12x extend (in opposite directions) perpendicularly to the shaft 10, whereas in the arrangement of Figs. 1 to 3 the axes of the pivots 13 are inclined in the same direction with reference to the direction of rotation, so that when projected in the above manner their projections intersect at an angle symmetrically with respect to the axis of shaft 10.

In order to minimize as far as possible the imposition on the shaft 10 of frictional forces, which constitute a serious cause of rough running, the pivot 20 is preferably constructed in a manner more particularly shown in Fig. 5. The pivot pin 20 is mounted between the jaws of the forked end of the shaft 10 and carries by means of a needle race 21 a floating bush 22, on which are rotatably mounted by means of needle races 23, 24 the inner boss of the links 12, 12x.

It will be seen from Fig. 5 that the link 12x has a single central boss carried on a needle race 24 and the link 12 has a bifurcated boss carried on needle races 23, the jaws of boss 12 and the races 23 embracing the boss 12x and race 24. By this means only the outer races 23, 24 are subjected to centrifugal loading, the opposed centrifugal forces of the arms 14 neutralizing one another in the floating bush 22 and the inner race 21 is only subjected to unsymmetrical loads derived from the oscillations of the links 12, 12x and the torque transmitted by the shaft 10. For this reason the frictional load on the inner bearing 20, 21, 22 is relatively light in view of the fact that the centrifugal loads are in general very much greater than the other loads. Alternatively, one or other of the needle races 23, 24 may be omitted, one of the links 12, or 12x, being fast on the bush 22 and the other link rotatable thereon. It is obvious that in the arrangement of Fig. 1 having a single link or balance member 12 the provision of a floating bush in the bearing 11 is unnecessary as this bearing is not subjected to centrifugal loading, the opposed centrifugal forces of the arms 14 neutralizing one another in the member 12.

Figs. 6 and 7 show the application of the invention to a screw propeller. In the case of a screw propeller driven by a reciprocating engine the driving shaft is subjected to a fluctuating torque and it is desirable to decrease as much as possible the torsional oscillations of the driven masses, namely the propeller blades. In applying the present invention to this case the masses which are hingedly mounted in such a way that angular displacement thereof in the plane of rotation is accompanied by angular displacement in a perpendicular plane are constituted by the propeller blades themselves. Thus in Fig. 6, which shows an arrangement corresponding to that of Fig. 1, the shaft 10 is the driving shaft of the propeller and the arrangement as regards the balance member 12 and pivots 11 and 13 are exactly the same as for Fig. 1. In this case however the weighted arms 14, 15 of Fig. 1 are replaced by the propeller blades 14x themselves.

In Fig. 7, the shaft 10, the compound pivot bearing 20, links 12, 12x and pivots 13 are exactly as in Fig. 4, the propeller blades 14x taking the place of the weighted arms 14, 15 as before.

Fig. 8 illustrates the mode of oscillation of the devices described above. The shaft axis is represented at O, and the link 12 of Figs. 1 and 6 or the corresponding links 12, 12x of Figs. 4 and 7 is (or are) represented by the line $A_1OA_2$ in one position and by the dotted line $A_1'OA_2'$ in a displaced position. The arms 14 or propeller blades 14x are represented by the lines $A_1B_1$ and $A_2B_2$ and in the displaced position by $A_1'B_1'$ and $A_2'B_2'$.

As a result of applying an oscillating torque to the shaft 10 the end of the shaft 10 carrying with it the link 12 or links 12, 12x, oscillates through an angle represented by $A_1OA_1'$ while the arm $A_1B_1$ oscillates through an angle $A_1C_1A_1'$ in the plane of rotation. Owing to the inclination of pivot 13 at $A_1$ the arm also executes an oscillation in a plane perpendicular to that of the figure. The points $C_1C_2$ constituting the nodes of the oscillation in the plane of rotation of the arms $A_1B_1$, $A_2B_2$ are situated substantially at the centres of inertia of the arms with respect to the pivots $A_1$, $A_2$ and for this reason the slots 17 of the spider 18 in the shaft couplings shown in Figs. 1 to 5 should be located at the same radial distance as the centres of inertia of the weighted arms 14, 15 about their pivots 13.

In the case of a shaft coupling, the amplitude of torsional oscillation of the spider 18 and shaft 19 is though smaller than that of the shaft 10, namely $A_1OA_1'$, nevertheless not zero and the node in this case occurs near the centre of inertia of arm 14, 15 and may not be actually at the slot joint 17 (in Figs. 1 to 5).

It can be shown that the natural frequency $p$ of the system of Fig. 8 is given by $$(2\pi p)^2 = \frac{f^2}{e} - \frac{F}{I}$$

where $f$ and $e$ are the lengths of $OC_1$ and $OA_1$ respectively, $I$ is the moment of inertia of the weighted rod $A_1B_1$ about its centre of inertia $C_1$ and $F$ the centrifugal force applied at $C_1$ provided the length $e$ is small compared with $f$.

In a shaft coupling as shown in Figs. 1 to 5 the natural frequency is modified by the inertia of the spider 18 and other masses carried by the second shaft 19 the general effect of this being equivalent to increasing the value of $I$.

The centrifugal force $F$ is proportional to the square of the rotational speed and the natural frequency of the system is thus proportional to the rotational speed, so that if resonance does not occur at one speed it cannot occur at any speed and there is therefore no critical speed.

In the arrangements having a single link 12, the oscillation of the arms 14, 14x in the plane containing the shaft 10 takes place as shown in Figs. 1 and 6, the arms swinging see-saw wise, i. e. in opposite directions with respect to the axial direction of the shaft 10. In the arrangements having two links 12, 12x, the mode of oscillation is scissorwise, the arms swinging in the same direction with respect to the axial direction as shown in Figs. 4 and 7. This is on account of the difference in the relative orientation of the pivots 13 to one another between the constructions of Figs. 1 and 6 and those of Figs. 4 and 7.

What I claim is:—

1. A rotating power transmitting mechanism adapted to cooperate with means imposing rotative motion and means resisting the rotative motion, one of which means is fluctuating in its torsional action, said mechanism including: a rotating shaft member or the like; a mass element having its mass centre offset from the axis of rotation and movable with relation to said member; and an interconnection between said member and said element comprising a link pivotally coupled to said member and to said element on relatively angled axes each of which is also at an angle to the shaft axis and constraining said element, under the influence of torque variations, to oscillate bodily about a centre of inertia radially spaced from both pivot axes in a path which is at an oblique angle to a plane perpendicular to the general axis of rotation of the mechanism.

2. A construction according to claim 1, and in which said mass element is formed as a propeller blade adapted to cooperate with a fluid medium as the resistance means.

3. A rotating power transmitting mechanism adapted to cooperate with means imposing rotative motion and means resisting the rotative motion, one of which means is fluctuating in its torsional action, said mechanism including: a rotating shaft member or the like; a mass element, through which the torque is transmitted, having its mass centre offset from the axis of rotation and movable with relation to said member; and an interconnection between said member and said element comprising a link pivotally coupled to said member and to said element on relatively angled axes each of which is also at an angle to the shaft axis and constraining said element, under the influence of torque variations, to oscillate bodily about a centre of inertia radially spaced from both pivot axes in a path which is at an oblique angle to a plane perpendicular to the general axis of rotation of the mechanism.

4. A construction according to claim 3, and in which said mass element is formed as a propeller blade adapted to cooperate with a fluid medium as the resistance means.

5. In a rotary power transmission system, subjected to fluctuating torque, mechanism for decreasing the amplitude of torsional oscillation of the system, comprising a shaft, a link pivoted at its centre upon said shaft, a pair of oppositely disposed masses the mass centres of which are offset from the axis of said shaft, and pivot means articulating said masses, respectively, upon opposite ends of said link in such manner that displacement of the masses relatively to the shaft in the plane of rotation, under the influence of torque fluctuations, is associated with a relative displacement in the plane containing the rotational axis.

6. In a rotary power transmission system, subjected to fluctuating torque, mechanism for decreasing the amplitude of torsional oscillation of the system, comprising a shaft, a pair of oppositely disposed links articulated to the shaft on a common pivot axis, a pair of oppositely disposed masses the mass centres of which are offset from the axis of said shaft, and pivot means articulating said masses, respectively, to the free ends of said links in such manner that displacement of the masses relatively to the shaft in the plane of rotation, under the influence of torque fluctuations, is associated with a relative displacement in the plane containing the rotational axis.

7. A power transmission system according to claim 6, wherein the axis of the pivot coupling the links to the shaft intersects the shaft axis at right angles and the axes of the pivots and articulating said masses to the links are inclined with respect to a plane perpendicular to the shaft axis.

8. A power transmission system according to claim 6, wherein the axis of the pivot coupling the links to the shaft intersects the shaft axis at right angles and the axes of the pivots articulating said masses to the links are inclined with respect to a plane perpendicular to the shaft axis and are oppositely inclined with respect to the direction of rotation, i. e., so that their projections on a plane containing the axis of rotation and also containing the axis of the pivot connecting the links to the shaft are coincident, when the links, extending in opposite directions, are perpendicular to the shaft.

9. A power transmisson system according to claim 6, wherein the common pivot coupling the links to the shaft comprises a member rotatable on a part carried by the shaft and on which both links are mounted, at least one of the links being rotatable on said member.

10. In a shaft coupling subjected to fluctuating torque, the combination with coaxial driving and driven shafts of a mass element having its mass centre offset from the centre of rotation of the coupling, means connecting said mass to one of said shafts for movement relative thereto in such a manner that displacement of the mass relatively to the shaft in the plane of rotation, under the influence of torque fluctuation, is associated with a relative displacement in a plane containing the rotational axis, and an arm or the like mounted to rotate with the other shaft and drivingly connected with said mass element.

11. In a shaft coupling subjected to fluctuating torque, the combination with coaxial driving and driven shafts of a mass element having its mass centre offset from the centre of rotation of the coupling, means connecting said mass to one of said shafts for movement relative thereto in such a manner that displacement of the mass relatively to the shaft in the plane of rotation, under the influence of torque fluctuation, is associated with a relative displacement in a plane containing the rotational axis, and an arm or the like mounted to rotate with the other shaft and drivingly connected with said mass element at a point offset from the axis of rotation.

12. In a shaft coupling subjected to fluctuating torque, the combination with coaxial driving and driven shafts of a mass element having its mass centre offset from the centre of rotation of the coupling, means connecting said mass to one of said shafts for movement relative thereto in such a manner that displacement of the mass relatively to the shaft in the plane of rotation, under the influence of torque fluctuation, is associated with a relative displacement in a plane containing the rotational axis, and an arm or the like mounted to rotate with the other shaft and drivingly connected with said mass element at a point offset from the axis of rotation, said driving connection being such that relative movement between said arm and said mass element, at the point of connection, can take place substantially only in a direction parallel to the axis of rotation.

13. In a shaft coupling subjected to fluctuating torque, the combination with coaxial driving and driven shafts of a mass element having its mass centre offset from the centre of rotation of the coupling, means connecting said mass to one of said shafts for movement relative thereto in such a manner that displacement of the mass relatively to the shaft in the plane of rotation, under the influence of torque fluctuation, is associated with a relative displacement in a plane containing the rotational axis, and an arm or the like mounted to rotate with the other shaft and drivingly connected with said mass element at or near the centre of inertia of said element.

14. In a rotary power transmission system, subject to fluctuating torque, means for decreasing the amplitude of torsional oscillation comprising: a shaft having a pivot thereon set at an angle to and intersecting the shaft axis; link means connected to said pivot; secondary pivot means in said link means, angled with respect to the shaft axis and to the first named pivot means, and spaced radially outwardly from the latter; and rotating-weight means connected to said secondary pivot means and adapted to oscillate about a centre of inertia spaced radially outwardly from the secondary pivot means.

15. In a rotary power transmission system subject to fluctuating torque, means for decreasing the amplitude of torsional oscillation comprising: a shaft having a pivot thereon set at an angle to and intersecting the shaft axis; link means connected to said pivot; secondary pivot means in said link means, angled with respect to the shaft axis and to the first-named pivot means, and spaced radially outwardly from the latter; and rotating-weight means connected to said secondary pivot means and adapted to oscillate about a centre of inertia spaced radially outwardly from the secondary pivot means a greater distance than the distance between said pivot and said secondary pivot means.

16. In a rotary power transmission system, subjected to fluctuating torque, means for decreasing the amplitude of torsional oscillation comprising a shaft, a mass offset therefrom and means connecting said mass to said shaft, including a link pivotally connected to the shaft by a pivot whose axis intersects the shaft axis at right angles, and pivotally connected to the mass by a pivot whose axis is offset from the first-named pivot axis, the projections of said pivot axes on a plane at right angles to the common perpendicular to said pivot axes being at an acute angle to one another.

17. In a rotary power transmission system, subjected to fluctuating torque, means for decreasing the amplitude of torsional oscillation comprising a shaft, a mass offset therefrom and means connecting said mass to said shaft, including a link pivotally connected to the shaft by a pivot whose axis intersects the shaft axis at right angles, and pivotally connected to the mass by a pivot whose axis is offset from the first-named pivot axis, the projections of said pivot axes on a plane at right angles to the common perpendicular to said pivot axes being at an acute angle to one another and the offset of the mass from said shaft axis being large compared with the offset between the pivot axes.

18. A rotating power transmitting mechanism adapted to cooperate with means imposing rotative motion and means resisting the rotative motion, one of which means is fluctuating in its torsional action, said mechanism including: a rotating shaft member or the like; a mass element having its mass centre offset from the axis of rotation and movable with relation to said member; and an interconnection between said member and said element comprising a link pivotally coupled to said member on an axis perpendicular to the axis of said member, and to said element on an axis obliquely skewed with reference to the first-named pivot axis.

19. A rotating power transmitting mechanism adapted to cooperate with means imposing rotative motion and means resisting the rotative motion, one of which means is fluctuating in its torsional action, said mechanism including: a rotating shaft member or the like; a mass element having its mass centre offset from the axis of rotation and movable with relation to said member; and an interconnection between said member and said element comprising a linkage having two non-intersecting pivots, whereof the pivot axis remote from said member is obliquely skewed with reference to the axis of said member, the other pivot axis being out of parallelism with the axis of said member.

20. A rotating power transmitting mechanism adapted to cooperate with means imposing rotative motion and means resisting the rotative motion, one of which means is fluctuating in its torsional action, said mechanism including: a rotating shaft member or the like; a mass element having its mass centre offset from the axis of rotation and movable with relation to said member; and an interconnection between said member and said element comprising a linkage having two non-intersecting pivots, whereof the pivot axis remote from said member is obliquely skewed with reference to the axis of said member, but is relatively near thereto in comparison with the distance therefrom of the mass center of said element, the other pivot axis being out of parallelism with the axis of said member.

JAMES ALLAN JAMIESON BENNETT.